C. & A. C. WEISS.
SPRING FASTENER.
APPLICATION FILED OCT. 9, 1917.
1,278,406.
Patented Sept. 10, 1918.
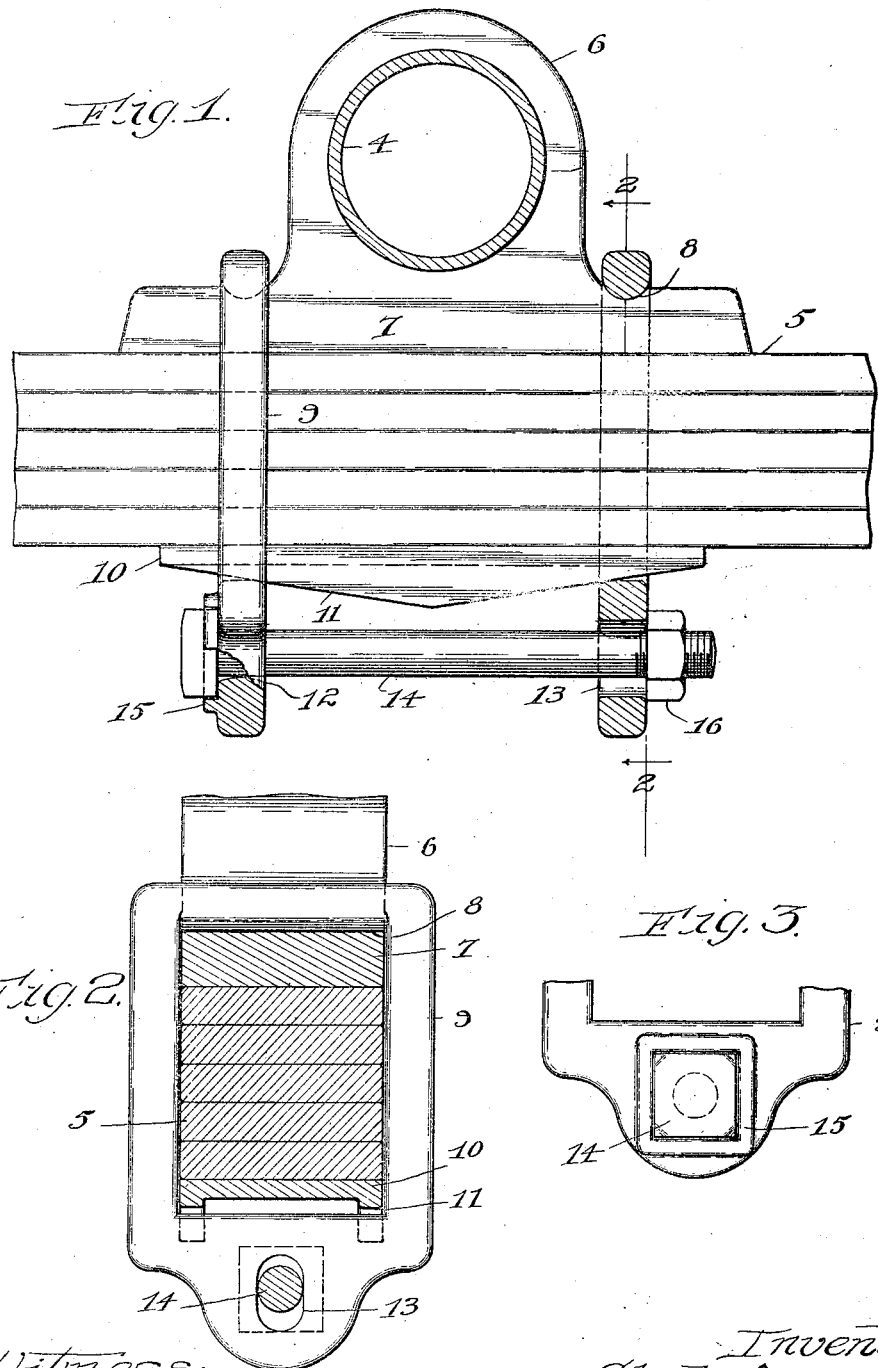
Inventors
Charles Weiss,
Abraham C. Weiss,
By Glenn S. Noble, Atty.

UNITED STATES PATENT OFFICE.

CHARLES WEISS AND ABRAHAM C. WEISS, OF CHICAGO, ILLINOIS.

SPRING-FASTENER.

1,278,406.  Specification of Letters Patent.  Patented Sept. 10, 1918.

Application filed October 9, 1917.  Serial No. 195,543.

*To all whom it may concern:*

Be it known that we, CHARLES WEISS and ABRAHAM C. WEISS, citizens of the United States, residing at Chicago, in the county of Cook and State of Illinois, have invented certain new and useful Improvements in Spring-Fasteners, of which the following is a specification.

This invention relates to means for fastening springs to other parts, and is particularly applicable for fastening vehicle springs to the axles.

The objects of this invention are to provide a new and improved form of spring fastener: to provide means for fastening a spring to an axle in the simple and efficient manner; to provide a spring fastener which can be tightened by means of a single bolt; and in general to provide such an improved form of device as will be described more fully hereinafter, In the accompanying drawings illustrating this invention;

Figure 1 is a side view of our improved fastener with parts shown in section;

Fig. 2 is a cross sectional view taken on line 2—2 of Fig. 1;

Fig. 3 is a detail.

As illustrated in these drawings, 4 represents a vehicle axle which may be of any ordinary shape or form and 5 represents the spring which is to be secured thereto. A hanger or bearing 6 is secured to the axle 4 in any suitable manner and may fit directly thereon as shown in Fig. 1. This hanger is provided with a plate 7 which engages with the spring 5 and is preferably of about the same width as the spring. The upper surface of the plate 7 has transverse grooves 8 for receiving the upper ends of two yokes or loops 9 which pass around the spring 5 and extend somewhat beyond the opposite side thereof. A wedge shaped plate 10 fits under the spring and engages with the yokes 9. The central lower portion of the plate 10 is preferably cut away so as to leave the wedge shaped flanges 11 on either side thereof which flanges engage with the inner edges of the lower portions of the yokes as shown in Figs. 1 and 2. The lower ends of yokes are provided with holes 12 and 13 for the bolt 14. One of these holes is preferably elongated for convenience in assembling. A socket 15 is arranged on one of the yokes to receive the head of the bolt 14 to prevent its turning when the nut 16 is tightened.

When the parts are assembled in the manner shown in the drawings, and the bolt is tightened, the yokes will be drawn against the tapered or beveled portions of the plate 10 and will press the plate against the spring and bind it tightly against the opposing plate 7. In this manner the spring is fastened in position by one bolt which can be done much more readily than with the usual fasteners now in use. By means of this arrangement, the springs may also be quickly loosened when desired, as for separating the leaves for oiling or other purposes.

From the above description, will be seen that we provide an exceedingly simple and efficient fastener which may be modified for different forms of springs and therefore we do not wish to limit ourselves to the exact construction or arrangement shown and described, except as specified in the following claims, in which we claim:

1. A spring fastener comprising a supporting member adapted to engage with one side of the spring and adapted to be secured to an axle, yokes engaging with said member and adapted to pass around the spring, a plate for engagement with the opposite side of the spring and having tapered surfaces for engagement with the yokes, and means for pressing the ends of the yokes adjacent the plate longitudinally of the tapered surfaces for clamping the parts together.

2. A spring fastener comprising a plate for engagement with one side of a spring, loops adapted to pass around said plate and the spring, a second plate adapted to engage with the opposite side of the spring and having oppositely arranged tapered surfaces for engagement with said loops, and a bolt engaging with said loops adjacent to the last named plate for pressing the ends of the loops adjacent the last named plate toward each other for clamping the parts together.

3. In a spring fastener, the combination of a pair of loops for encompassing a spring, a plate having oppositely disposed wedges for engagement with said loops, said loops having holes in the ends thereof adjacent said plate, and a bolt passing through said holes and serving to press the ends of the loops against said wedges.

4. The combination of a support adapted to be secured to an axle, said support having transverse grooves therein, a spring, yokes engaging at one end with said grooves and surrounding the spring, a plate having oppositely arranged beveled surfaces for engagement with the opposite ends of said yokes, and a bolt passing through said ends, one of said yokes having a socket for receiving the head of said bolt to prevent the same from turning.

5. The combination of a spring, a pair of yokes surrounding the spring, a plate engaging with the spring and having oppositely beveled flanges for engagement with said yokes, said yokes having holes therethrough adjacent to the plate, and a bolt passing through said holes for drawing the ends of the yokes together to press the plate against the spring.

CHARLES WEISS.
ABRAHAM C. WEISS.

Copies of this patent may be obtained for five cents each, by addressing the "Commissioner of Patents, Washington, D. C."